(12) United States Patent
Lynch

(10) Patent No.: US 11,455,903 B2
(45) Date of Patent: Sep. 27, 2022

(54) PERFORMING A REMEDIATION BASED ON A BAYESIAN MULTILEVEL MODEL PREDICTION

(71) Applicant: Pearson Education, Inc., Bloomington, MN (US)

(72) Inventor: Jay K. Lynch, Arvada, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 287 days.

(21) Appl. No.: 16/899,462

(22) Filed: Jun. 11, 2020

(65) Prior Publication Data

US 2021/0390872 A1    Dec. 16, 2021

(51) Int. Cl.
*G09B 7/00* (2006.01)
*G06F 16/9535* (2019.01)
*G06N 20/00* (2019.01)
*G06N 7/00* (2006.01)

(52) U.S. Cl.
CPC ........... *G09B 7/00* (2013.01); *G06F 16/9535* (2019.01); *G06N 7/005* (2013.01); *G06N 20/00* (2019.01)

(58) Field of Classification Search
CPC .......... G09B 7/00; G06N 20/00; G06N 7/005; G06F 16/9535
See application file for complete search history.

(56) References Cited

U.S. PATENT DOCUMENTS

| | | | | |
|---|---|---|---|---|
| 6,652,287 | B1* | 11/2003 | Strub | G06Q 50/20 434/365 |
| 10,482,391 | B1* | 11/2019 | Lynch | G06N 5/003 |
| 2009/0317786 | A1* | 12/2009 | Alcorn | G09B 7/02 434/323 |
| 2010/0151431 | A1* | 6/2010 | Miller | G09B 5/00 434/350 |
| 2010/0268686 | A1* | 10/2010 | Germany, II | G09B 7/02 707/E17.019 |
| 2012/0231437 | A1* | 9/2012 | Fakhrai | G09B 7/00 434/350 |
| 2012/0231438 | A1* | 9/2012 | Fakhrai | G09B 7/00 434/350 |
| 2015/0235561 | A1* | 8/2015 | Lynch | G09B 7/00 434/362 |

(Continued)

*Primary Examiner* — David E Choi
(74) *Attorney, Agent, or Firm* — Quarles & Brady LLP

(57) ABSTRACT

A website may track online activities, such as assignments and/or assessment, of students taking online digital courses (courses). Courseware-level data and student-level data may be extracted from the tracked online activities and as well as student registration data. Institutional-level data may be generated from data regarding the institutions that teach the courses. Teacher-level data may be generated for the teachers teaching the courses. A teacher or student may request on a website an analysis of a course. Data for the course may be weighted in the courseware-level data. Data for the student(s), institution and/or teacher may also be weighted, depending on the desired analysis. A Bayesian multi-level model may generate a plurality of posterior distributions using the collected data. A prediction of a difficult subject matter may be determined from the plurality of posterior distributions and used to select a targeted remediation that may be performed on a website.

20 Claims, 14 Drawing Sheets

(56) References Cited

U.S. PATENT DOCUMENTS

| | | | | |
|---|---|---|---|---|
| 2015/0235564 A1* | 8/2015 | Lynch | ................ | G09B 5/00 |
| | | | | 434/362 |
| 2015/0279221 A1* | 10/2015 | Barber | ................ | G09B 7/00 |
| | | | | 434/353 |
| 2016/0085754 A1* | 3/2016 | Gifford | ................ | G06Q 10/00 |
| | | | | 707/723 |
| 2016/0117703 A1* | 4/2016 | Woddi | ................ | G06Q 30/0204 |
| | | | | 705/7.33 |
| 2016/0180150 A1* | 6/2016 | Negi | ................ | G06V 40/45 |
| | | | | 382/118 |
| 2018/0032945 A1* | 2/2018 | Chetlur | ................ | G06F 3/038 |
| 2019/0206271 A1* | 7/2019 | Cosyn | ................ | G09B 5/06 |
| 2019/0295186 A1* | 9/2019 | Zhou | ................ | G06F 16/9535 |
| 2020/0357296 A1* | 11/2020 | Sharma | ................ | G06Q 50/2057 |
| 2021/0304630 A1* | 9/2021 | Hickey | ................ | G09B 5/08 |
| 2021/0390872 A1* | 12/2021 | Lynch | ................ | G06F 16/9535 |
| 2022/0139252 A1* | 5/2022 | Sawyer | ................ | G09B 9/165 |

* cited by examiner

| Courseware-Level Data 600 | Student-Level Data 601 | Institution-Level Data 602 | Teacher-Level Data 603 |
|---|---|---|---|
| Homework Scores | Previoius Courses Taken | Institutional Location (e.g., state, region, country) | Previous Courses Taught |
| Time Spent on Homework Assignments | Grades for Courses | Size (number of students or faculty) | Age |
| Exam Scores | Time spent on Homework in Courses | Admission Requirements | College GPA |
| Time Spent on Each Exam Question | Major | Graduation Rates | High School GPA |
| Scores on Study Plan Activities | Minor | 2/4 Year College | Highest Level of Education |
| Data Activity Accessed | Survey Responses | Student Body Demographics | Survey Responses |
| Objective/Section/Chapter Information for each Exam Question | High School GPA | Historical Institution Performance with Courseware | Historical Performance Teaching Courseware |
| Number of Attempts for Homework/Exams | SAT/ACT Scores | | Number of Years Teaching |
| Handed In Date | Age | | Number of Times Teaching the Course |
| Question Type (multiple choice, T/F, etc.) | Academic Goals | | |

FIG. 6

Exam Query (Typical Fields)

| | |
|---|---|
| xl_course_id | 77719_d21 |
| book_title | Math130/Math240, |
| course_id | 5049458 |
| course_start_date | 2018-10-02 00:00:00, |
| course_end_date | 2020-10-01 00:00:00, |
| user_id | .. |
| last_name | .., |
| firstname | .., |
| sms_user_id | 92828063, |
| grade_category | Test, |
| test_name | 8-3 MyStatLab: Final Examination, |
| total_test_questions | 28, |
| total_test_points | 280, |
| creator_type | 1, |
| test_format | 3, |
| test_date | 2018-08-25 21:13:00, |
| test_handed_in_date | 2018-08-26 00:23:00, |
| test_duration | 11420, |
| test_score | 50.86026, |
| test_number_correct | 9, |
| test_points_correct | 142.408730506897, |
| test_number_incomplete | 0, |
| test_number_incorrect | 7, |
| test_score_changed | NULL, |
| chapter | Discrete Probability Distributions, |
| section | Discrete Random Variables, |
| objective | Distinguish between discrete and continous random variables., |
| book_id | 93291, |
| course_title | MAT-240X6772 Applied Statistics 18EW6, |
| question_id | 3, |
| question_correct | 10, |
| question_duration | 679, |
| question_order_number | 3, |
| chapter_id | 8, |
| section_id | 1, |
| objective_id | 1, |
| attempt_number | 1, |
| exercise_id | 8, |
| customexercise_id | NULL, |
| question_type | 0, |
| order_no | 3, |
| difficulty | -1.5, |
| mediantime | 130, |
| firsttrycorrect | 0.57178237481212 |

Homework Query (Typical Fields)

| | |
|---|---|
| sms_course_id | .. |
| studyID | .. |
| Campus | .. |
| FinalGrade | CE |
| PrevCrseAttempts | 0 |
| EnrollmentStatus | StillRegistered |
| activity_date | 1/17/2109 18:46 |
| activity_id | 516093961 |
| activity_iso_date | 1/17/2019 |
| activity_label | Unit 1:Section 2.1 Homework |
| activity_score | 0.95 |
| attempt | 1 |
| attempts_allowed | 1 |
| availafterdue | 1 |
| chapter_id | 3 |
| chapter_title | Equations, Inequalities, and Problem Solving |
| classification | Homework |
| classification_id | 2 |
| course-creation | 54:50.6 |
| course_title | 201952 MAT020-201 30894 |
| creator_type | 0 |
| due_date | 1/22/2019 23:59 |
| duration | 1333 |
| finalduedate | 8/11/2019 0:00 |
| handedin | 2/4/2019 0:00 |
| institution_key | DTCC |
| instructor_email | lbivens@dtcc.edu |
| is_duration_cumulative | 1 |
| is_gradable | 1 |
| item_hash | a83bcb011d5485d2be9b520913fd9597 |
| items_worked | 20 |
| lastlogin | 1/17/2019 18:46 52:38.5 |
| mastered | 0 |
| order_no | 3 |
| points_awarded | 19 |
| process_date | 2/4/2019 |
| score_changed | 0 |
| source_system | XLActivitySource |
| status | complete |
| total_items | 20 |
| total_points_availble | 20 |
| weight | 10 |

PERFORMING A REMEDIATION BASED ON A BAYESIAN MULTILEVEL MODEL PREDICTION

FIELD OF THE INVENTION

This disclosure relates to improving online educational experiences in real-time using Bayesian multilevel modeling.

SUMMARY OF THE INVENTION

The present invention may use any desired data, such as courseware-level data (data regarding course structure and prior performance by students in courses), student-level data (students' registration data and data gathered while students are performing course work), institutional-level data (data regarding institutions offering the courses) and teacher-level data (data regarding the teachers that are teaching the courses) with a Bayesian multi-level model. The Bayesian multi-level model may generate a plurality of posterior distributions that may be used to predict problematic areas and concepts. Each posterior distribution may be used to determine, as non-limiting examples, a difficulty level of a chapter, homework assignment or course objective. In combination, the plurality of posterior distributions may be used to determine problematic areas. For example, higher numbers representing the amount of time to do an assignment or lower numbers representing a percentage correct on an assessment may be determined to be problematic areas that may need remediation. The plurality of posterior distributions may also be used to create and display graphs that visually indicate which areas (such as a particular chapter in a book or a particular subject matter) are likely to be the most difficult for the students to learn or the teacher to teach. Remediation(s) may be selected and performed on either the student(s) and/or the teacher by a website based on the predicted problematic areas and concepts.

A website, comprising software running on one or more servers, may be used to collect and store, in real time, online activities of a plurality of students taking a plurality of courses. The online activities may be, as non-limiting examples, assessments and course assignments. In this manner grades of assessments, times taken to study particular subjects (such as to read a particular chapter), and any other desired student performance metric for each of the students and each of the courses. The website may extract courseware-level data and/or student-level data from the tracked online activities of the plurality of students taking the plurality of online courses.

The website may also collect and store institutional-level data for a plurality of educational institutions and possibly even teacher-level data regarding the teachers that are teaching the plurality of courses.

A student or a teacher may request an analysis of an online course. The student or teacher may request the analysis to determine which areas or subjects are predicted to be the most difficult.

In some embodiment, any part or parts of the data may be weighted to customize the analysis of the Bayesian multi-level model. In preferred embodiments, course data, in the courseware-level data, for the course being analyzed is heavily weighted. In some embodiments, the data for the student or students, in the student-level data, taking the course may be weighted. In some embodiments, data for an institution being analyzed or the institution offering the course, in the institutional-level data, may be weighted. In some embodiments, a teacher being analyzed or the teacher offering the course, in the teacher-level data, may be weighted. Thus, for a student requesting an analysis of a course, data for the course, data for the student, data for the institution offering the course and data for a teacher teaching the course may all be weighted (or any sub-combination thereof), thereby customizing the analysis to the specific scenario of the student taking the course with the teacher at the educational institution. In other embodiments, any sub-combination of using and/or weighting the courseware-level data, student-level data, institution-level data and teacher-level data may also be used.

The weighted data may be used by a Bayesian multi-level model to generate a plurality of posterior distributions. The plurality of posterior distributions may be a way to summarize what is known about uncertain quantities in a Bayesian analysis. The plurality of posterior distributions is a combination of the prior distributions and the likelihood function, which indicates what information is contained in the observed data (the "new evidence").

One or more predictions may be generate from the plurality of posterior distributions from the Bayesian multi-level model using the (preferably weighted) courseware-level data, the student-level data, the institutional-level data and/or teacher-level data.

The one or more predictions (such as students are most likely to have a problem with chapters 4 and 7 covering balancing equations and stoichiometry in chemistry) may be used to determine one or more targeted remediations for the students and/or teacher. A website, comprising one or more webpages, may inform a teacher or students of the predicted problematic topics or areas, preferably using a graph or chart to illustrate the potential problem areas. The website may also provide access and perform the targeted remediation on the teacher or the students.

After the remediation has been display, offered and/or performed on the teacher or students, the website preferably continues to collect and store new data regarding students' future online activities as the students take more courses. The new data (along with the old data described above) may also be used with the Bayesian multi-level model to produce improved posterior distributions, which produce more accurate predications and thus improves the selection of future targeted remediations for the teacher and students.

The above features and advantages of the present invention will be better understood from the following detailed description taken in conjunction with the accompanying drawings.

BRIEF DESCRIPTION OF THE DRAWINGS

FIGS. 6 and 7 illustrate tables that list possible categories of data that may be used with either courseware-level data, student-level data, institutional-level data or teacher-level data.

DETAILED DESCRIPTION

Figure 1:
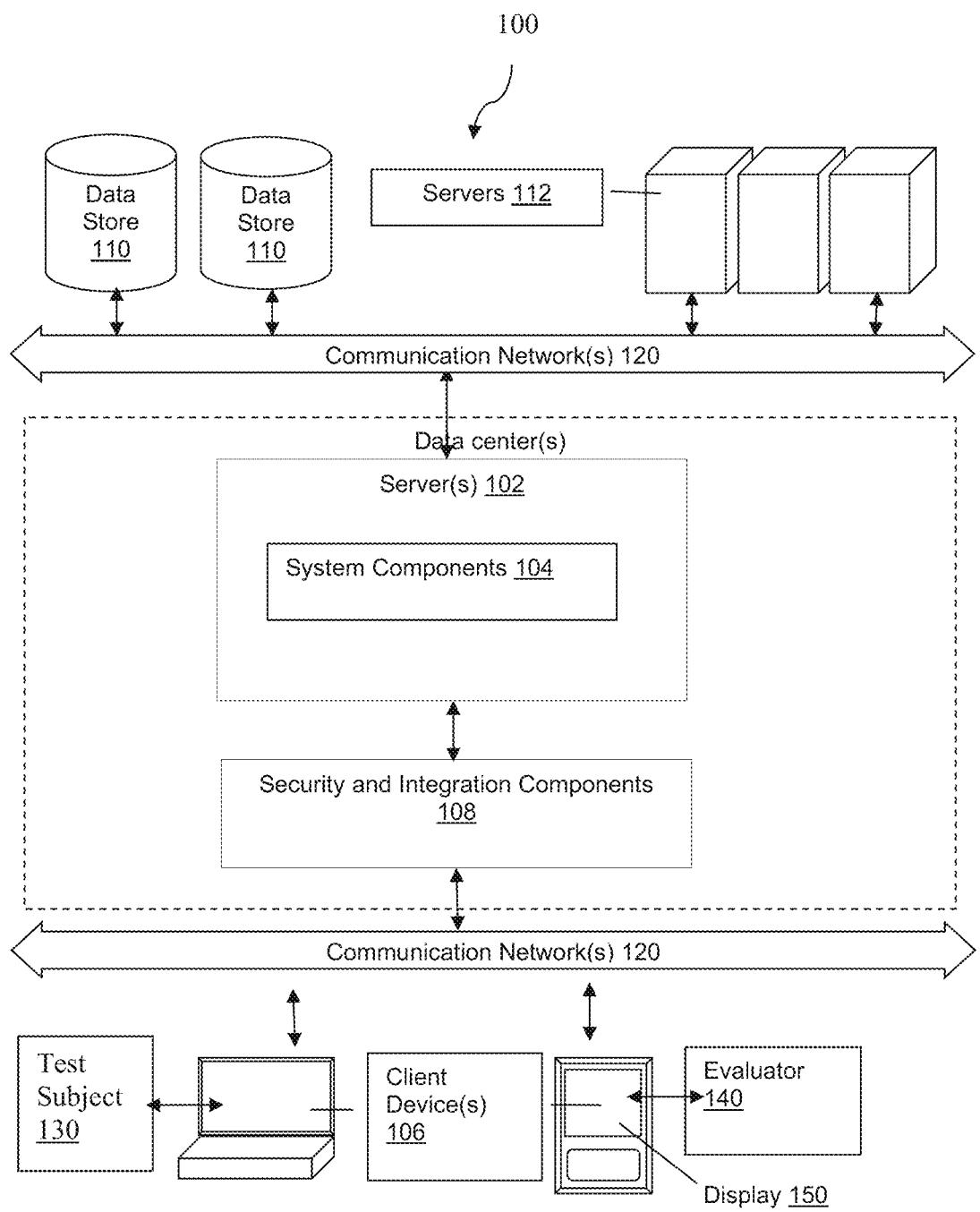
FIG. 1 illustrates a system level block diagram for a non-limiting example of a distributed computing environment that may be used in practicing the invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
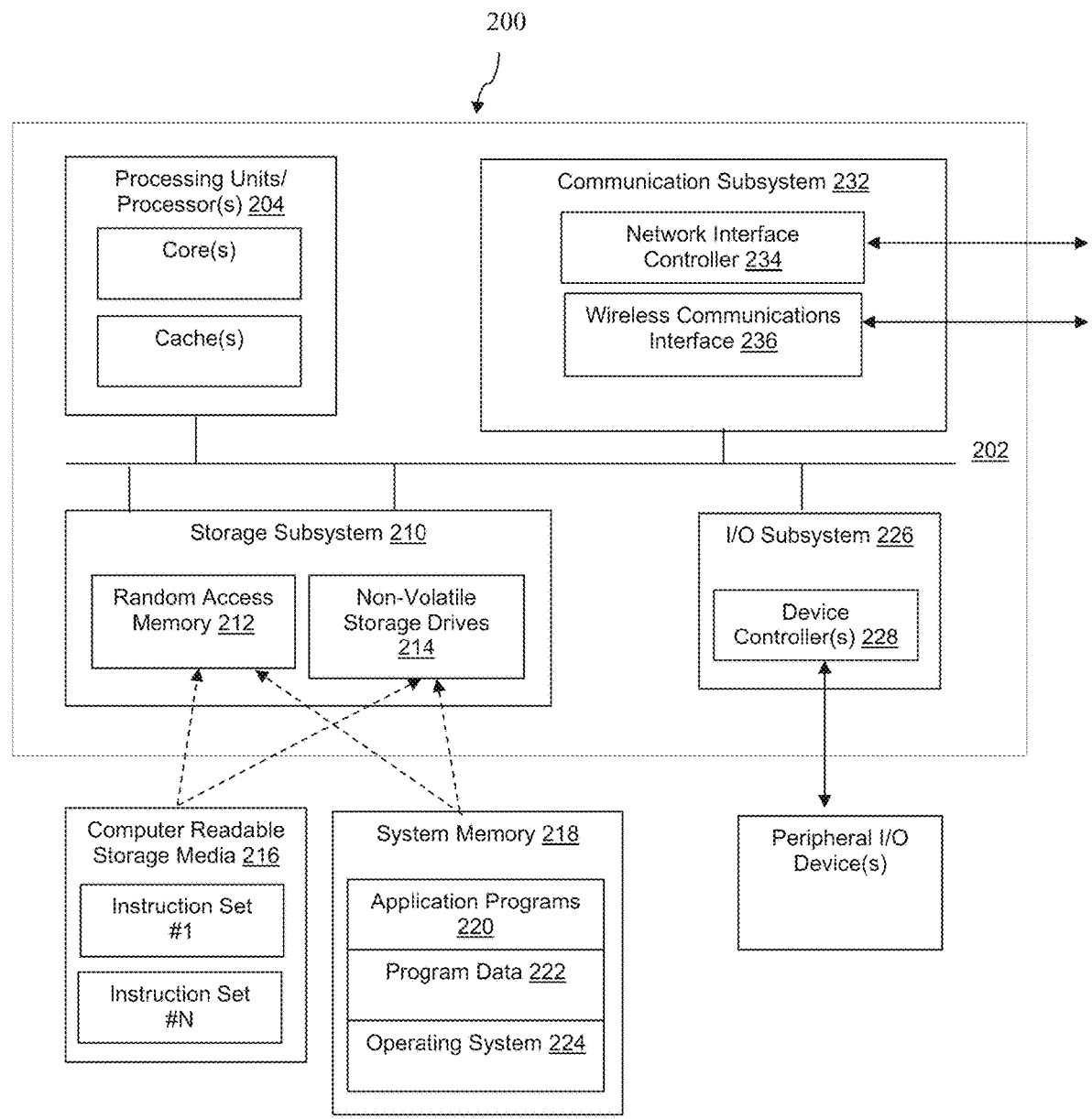
FIG. 2 illustrates a system level block diagram for an illustrative computer system that may be used in practicing the invention.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users.

As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Computing environment 100 also may include one or more data stores 110 (which may also be referred to as a database), possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Computer System

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein.

Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams Etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Upon entering a digital course, teachers/instructors and students often lack visibility into many important factors that powerfully influence course quality and student success. The teachers and students may also lack access to related just-in-time tools and resources to help turn these insights into curricular and behavioral improvements that support improved learner outcomes.

For example, an adjunct faculty member may be tasked with teaching a course she has never taught before and thus has little sense of what chapters will be the most difficult for students and where to provide additional instruction; or an instructor may have been teaching with a digital title for several terms but lacks the pedagogical knowledge needed to improve student performance on a learning objective that has been revealed to be consistently challenging. Without these sources of information, instructors are limited in their ability to optimally focus instructional time, provide timely encouragements & guidance to learners, and target key concepts to improve student mastery.

On the other hand, when a student logs into his digital course he can view the table of contents and chapter sequencing, but isn't provided information about homework difficulty or what assignments may require additional time to complete successfully. Consequently, the student is denied valuable information needed to successfully monitor, plan, and regulate learning behaviors, in addition to being denied knowledge that may mitigate feelings of discouragement in response to unexpected struggles in the course.

This dearth of information provided to teachers and students is problematic given extensive research in the learning sciences revealing the critical educational importance of supportive and timely encouragements, maintaining learners' confidence and feelings of self-efficacy, clear expectations around study efforts and time commitments, and providing visible indicators of students' learning progress. Furthermore, given research showing low student and faculty awareness of effective teaching and studying strategies, there is a profound need to augment existing digital courseware with data-informed insights into the learning topography of a course in combination with targeted resources and tools to support positive behavioral and pedagogical changes.

What is needed is data/information from past courses that effectively surfaces the types of information outlined above, which could be used to support these important activities. Furthermore, delivering this information in a way that is personalized to a particular teaching context and is continually refined as more data about student performance is collected, would make these insights, and the recommendations associated with them, even more relevant, trustworthy, and impactful for instructors and learners.

In an example embodiment that seeks to address these needs, the present invention may provide data analysis tools that may indicate to an instructor which chapters and/or sections of a text are more difficult for their students. This would enable the instructor to update their teaching strategies and provide guidance for other lesson plans. The information provided to the teacher may change each term that the instructor teaches as additional data is collected over time.

Figure 8:
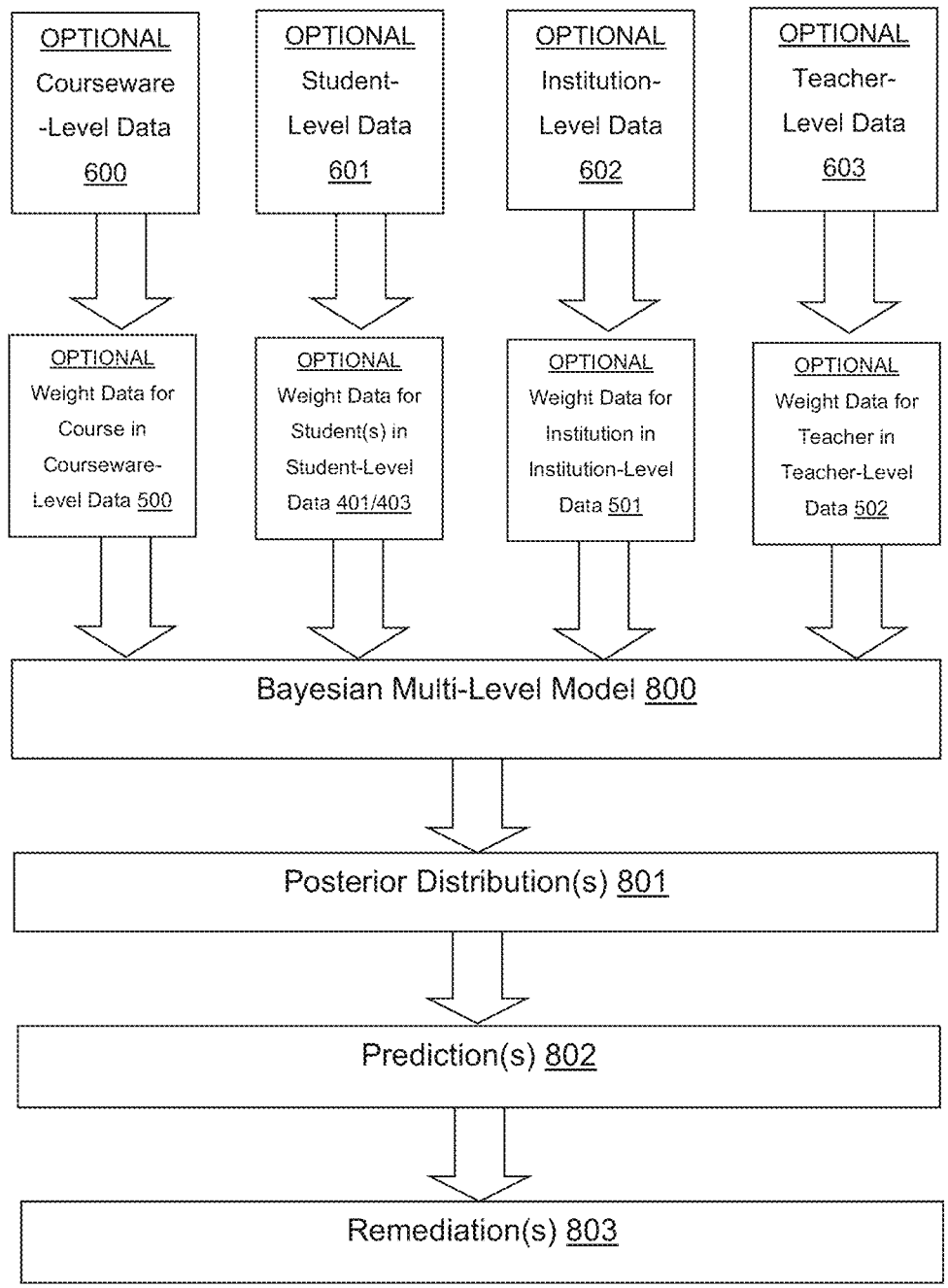
FIG. 8 illustrates a block diagram to generate a remediation using a Bayesian multilevel model.

Referring to FIG. 8, in another embodiment, the present invention is designed to wrap around a plurality of digital online courses to provide personalized and situationally informed instructional and behavioral guidance to faculty and students. Using a combination of courseware data, demographic and institutional information, and data from prior course and student performance, the invention may employ a Bayesian multi-level model 800 to determine estimates of course content challenge, activity study time requirements, and learning outcome difficulty levels. Furthermore, the invention may utilize these estimates to target intervention recommendations, suggest optimal opportunities for encouragement, and offer instructional tips and guidance for teaching difficult concepts. The invention provides students and faculty with personalized day-one insight into the 'learning topography' of a digital course—in conjunction with tailored resources and tips—while refining its estimates and recommendations as it continuously learns from the faculty and students who take the course.

Figure 10:
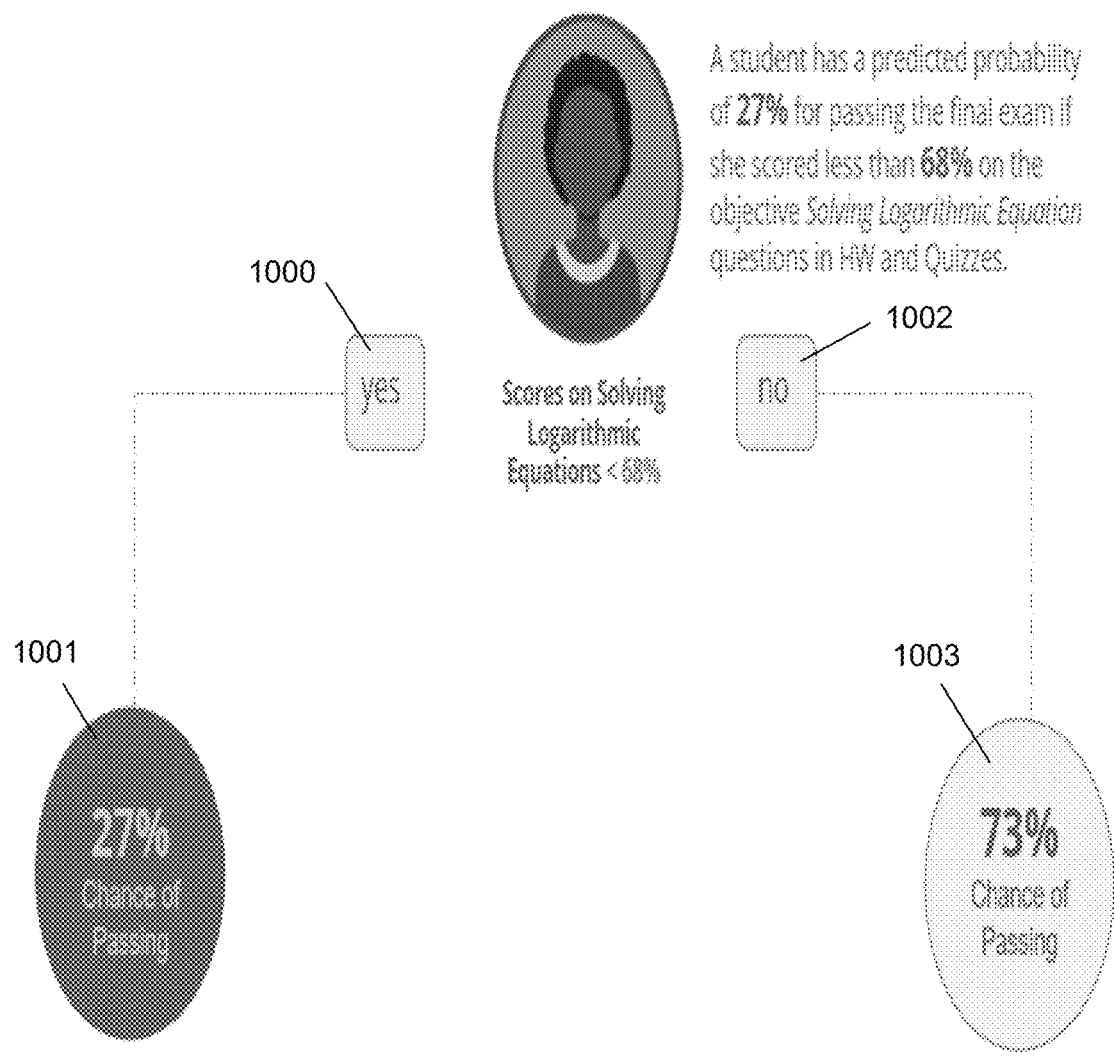
FIG. 10 illustrates a simple flowchart showing how prior objective performance predicts future success. While a student's prior objective performance is illustrated, a prior objective performance by a course, institution, students and/or teacher may also be used in a Bayesian multi-level model to predict future success.

Referring to FIGS. 6 and 10, a simplified example is provided to illustrate how past performances may be used to predict future results. A Bayesian multi-level model 800 may generate a plurality of posterior distributions 801 using any desired data, such as from prior courseware-level data 600, student-level data 601, institutional-level data and/or teacher-level data 603. The plurality of posterior distributions 801 may be used to predict that students who received a score of <68% on a test for solving logarithmic equations 1000 have a 27% chance of passing a final exam 1001 while students with a score equal or >68% on the test for solving logarithmic equations 1002 have a 73% chance of passing the final exam 1003.

In another embodiment, the present invention is designed to combine student performance data from a digital course, public information about the characteristics and demographics of the institution where it is used (e.g., institution type, geographical location, enrollment requirements, pass rates, demographics), course-specific data (e.g., student performance in previous terms, course design), and, if available, prior student performance in other digital products. This information is then combined to generate and determine key insights intended to support learning and instructional activities in the course.

In another embodiment, the present invention supports faculty by enabling them to adapt their teaching to emphasize and prioritize challenging topics, explore novel strategies for teaching key learning outcomes, and effectively time encouragements and interventions to help their students sustain motivation and confidence as they progress through the course. The tools within the invention would also enable faculty to quickly answer evaluative questions about the impact of interventions, see how their course performance compares to book averages, and visualize how student performance has changed over time. The present invention also provides a visible map of course challenge and difficulty for students, empowering them to self-regulate their learning behaviors and supports their success through tips and reminders that help them succeed and persevere through challenging topics in the course.

In another embodiment, the present invention may rely on creating a Bayesian multi-level model 800, which is useful for data structures with multiple levels or categories, such as courses from different universities that are themselves members of high-level categories of institutions (e.g., private versus public), to produce its estimates. Bayesian multi-level models 800 provide a flexible and optimal way to estimate complex group-level parameters by connecting information across and within levels to partially pool parameter estimates toward their level mean. This enables the present invention to generate initial estimates of key factors that are based on the unique combination of institutional and student characteristics where it is being used.

The use of Bayesian estimation in the present invention also allows it to easily update estimates if additional course-specific data is available through the inclusion of prior information. The initial course estimates generated when a faculty member has never previously taught using the digital courseware may be refined as she teaches the course and additional student performance information is incorporated in the model. This course-level data will function as prior information in the present invention's algorithm, producing subsequent estimates that increasingly reflect the faculty member's specific course context and student population.

Figure 11:
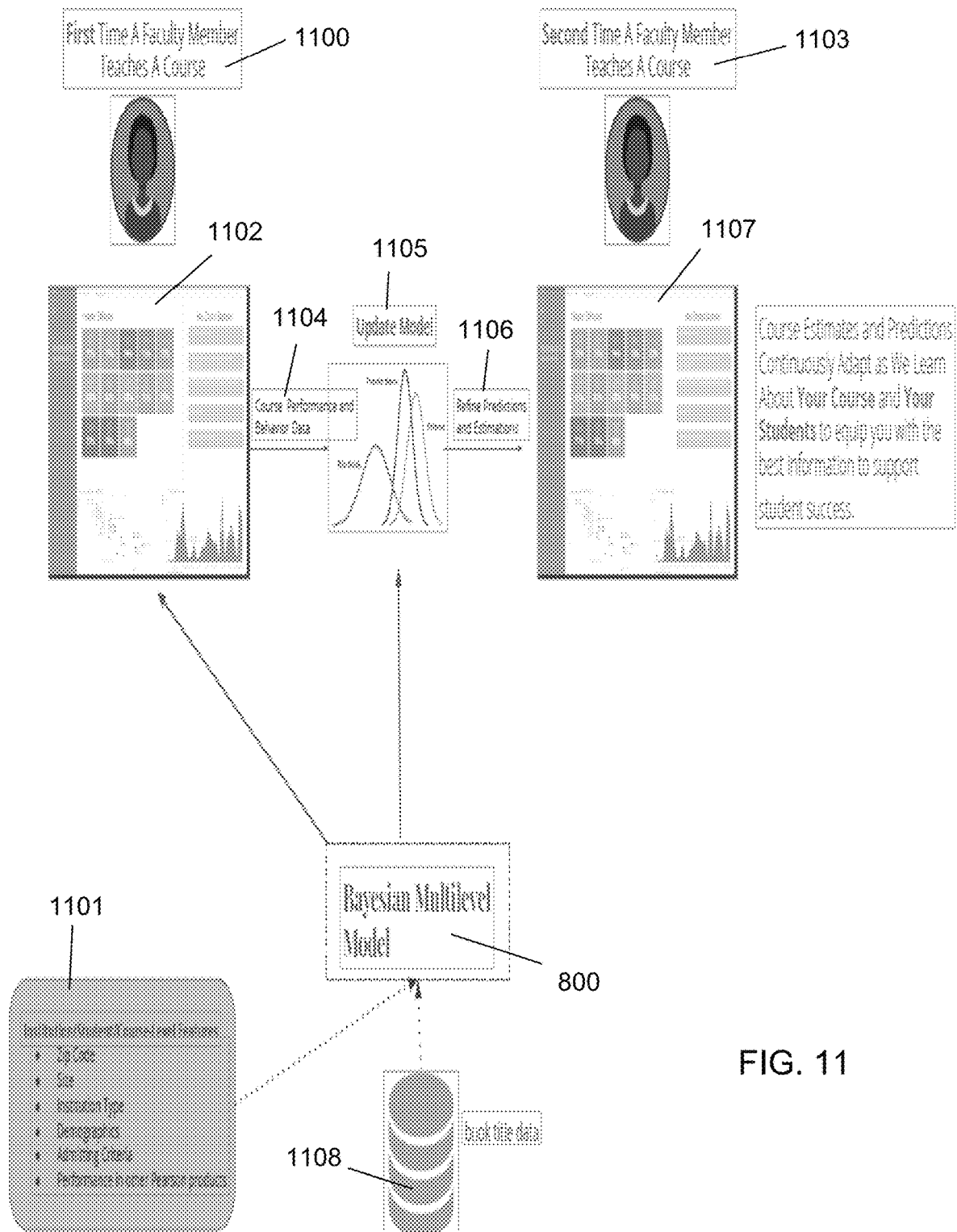
FIG. 11 illustrates a block diagram showing how a teacher may use the invention before ever teaching a class and how the system may be improved based on data (from the course, student(s), institution and teacher) continuously being collected over time, saved and used to update the Bayesian multi-level model, automatically and in real-time.

Referring to FIG. 11, a Bayesian multi-level model 800 may generate a plurality of posterior distributions 801 using data from any desired sources, as non-limiting examples, data from prior courseware-level data 1108, student-level data 601 and/or institutional-level data 1101, for a teacher teaching a class for a first time (first time faculty member teaches a course) 1100. The plurality of posterior distributions 801 may be used to generate one or more predictions 802 which may be used to generate one or more graphical illustrations 1102 to inform the teacher of potential problem areas, even though the teacher has never taught the class before. After the completion of the class, performance data for the students 1104 may be used to update 1105 the Bayesian multi-level model 800. The Bayesian multi-level model 800 use the new performance data from the students to further refine the plurality of posterior distributions 1106. The refined plurality of posterior distributions 801 may be used to make even more accurate predictions 802 which may be used to make more accurate graphical illustrations 1107. In preferred embodiments, the plurality of posterior distributions 801, predictions 802 and/or graphical representations are used, preferably automatically, to generate and administer remediations 803 that may be performed on the students and/or teacher. This may be accomplished the first time the teacher teaches the course or at any time thereafter.

The estimates and recommendations produced by the present invention may initially focus on several key instructional insights and may be combined with other supporting features. In particular, the present invention may provide personalized estimates of chapter, section, and objective difficulty of course content, a 'learning topography' of homework challenge in the course, identification of key learning objectives, course performance comparisons to book average and/or similar institutions, and tools to assess the impact of instructional interventions (e.g., statistical estimates of the probability students performed higher on Exam1 in the 2017 term compared to the 2018 term).

In addition to providing estimates of numerous key learning metrics in a course, the present invention may offer tailored suggestions and resources to help faculty support student success in response to these estimates. For example, if a Bayesian multi-level model 800 identifies a particular homework assignment as unusually challenging it can suggest that a faculty member send an encouragement to her students informing them of the upcoming spike in difficulty or, alternatively, if a student is provided access to the present invention's recommendations he can be alerted to the need to set aside additional time to complete an upcoming homework assignment.

Additional instructional resources can also be made available through the present invention, including tips and ideas from experts (e.g., faculty advisors or instructional designers) on how to teach a difficult concept and these resources can be further integrated with other services such as reminders about available tutoring hours.

The invention may also include a faculty portal, i.e., a website comprising one or more webpages running on one or more servers, that may provide faculty/teachers with an overview of a digital course's learning topography. As non-limiting examples, the digital course's learning topography may comprise one or more of course struggle points, identifying chapter challenges, providing expected time commitments, identifying learning objective importance to help instructional planning, provide timely encouragements and measure curricular improvements.

The invention may also include a student course companion that may comprise a digital course supplement that provides students an overview of course content challenge and behavioral expectations. The digital course supplement may also include an option for students to receive personalized time estimates, study tips, and notifications/encouragements.

The invention may also provide services integration. As a non-limiting example, the invention may identify challenging topics/sections in a course and be combined with other services and resources to increase its value and potentially upsell additional services.

The invention may provide a novel suite of features when it comes to digital online courseware, providing key insights, recommendations, and guidance on day one of a course. Rather than entering a course blind to assignment struggle points, critical learning objectives, and homework challenges, the invention may equip faculty/teachers and students with personalized insights into a learning experience that has hitherto been unavailable. When considering what digital course to adopt, this technology may be a massive differentiator, promising to give extensive visibility into the learning experience of a course and guiding both instructors/teachers and their students toward resources and tips to measurably increase students' successes.

The invention may allow faculty/teachers who have never taught a course or are teaching the course for the first time to be better prepared and understand important areas of focus and challenge for their students. In addition, more experienced faculty can validate their hunches and gain access to resources to help them improve (and measure) their teaching impact.

After teaching one or more courses to a plurality of students, the invention may learn from the students taking the course and provide even more accurate estimates and helpful recommendations to support greater learning behavior and help sustain student motivation in a course. The invention may learn from past teacher and/or student experiences and use this knowledge to make better predictions 802 and suggest better remediations 803 in the future.

Course information, possibly in the form of recommended remediations 803, may be provided directly to students (particularly around content difficulty, activity time estimates, and learning outcome importance) and will help them better self-regulate and allocate their study efforts. Tips and reminders may be generated and provided to students that will also encourage better learning behaviors and the adoption of effective learning strategies among students.

Combining the invention with targeted instructional recommendations (teaching tips/feedback reminders/course feature optimization) may also improve the pedagogical quality of the course and be a uniquely powerful tool for faculty to improve their skills as teachers. The invention may also be used to determine one or more remediations 803 for the teacher and/or the student(s) to help improve the teacher and/or student(s)'s performance in a course.

Referring to FIGS. 6 and 7, the invention may collect data regarding online digital courses (courseware-level data 600), the students taking the online digital course (student-level data 601), the institutions offering the courses (institution-level data 602) and/or the teachers teaching the courses (teacher-level data 603). The metadata, or categories of information that may be collected for the courseware-level data 600, student-level data 601, institution-level data 602 and/or teacher-level data 603, may be determined in any desired manner. FIGS. 6 and 7 list in a table format numerous non-limiting examples of courseware-level data 600, student-level data 601, institutional-level data and teacher-level data 603.

As a non-limiting example for determining the metadata for the courseware-level data 600, each online digital course (or its syllabus and/or course materials) may be electronically parsed to determine assignments, chapters within reading assignments, tests, and number and types of questions for each test. As another non-limiting example, an administrator may manually enter the metadata for the courses. As non-limiting examples, FIG. 6 and FIG. 7 illustrate some of the metadata or categories of information that may be collected and used for the online digital courses (courseware-level data 600), students (student-level data 601), institutions (institution-level data) and/or teachers (teacher-level data 603).

Track Students' Online Activities while Taking Courses

Figure 3:
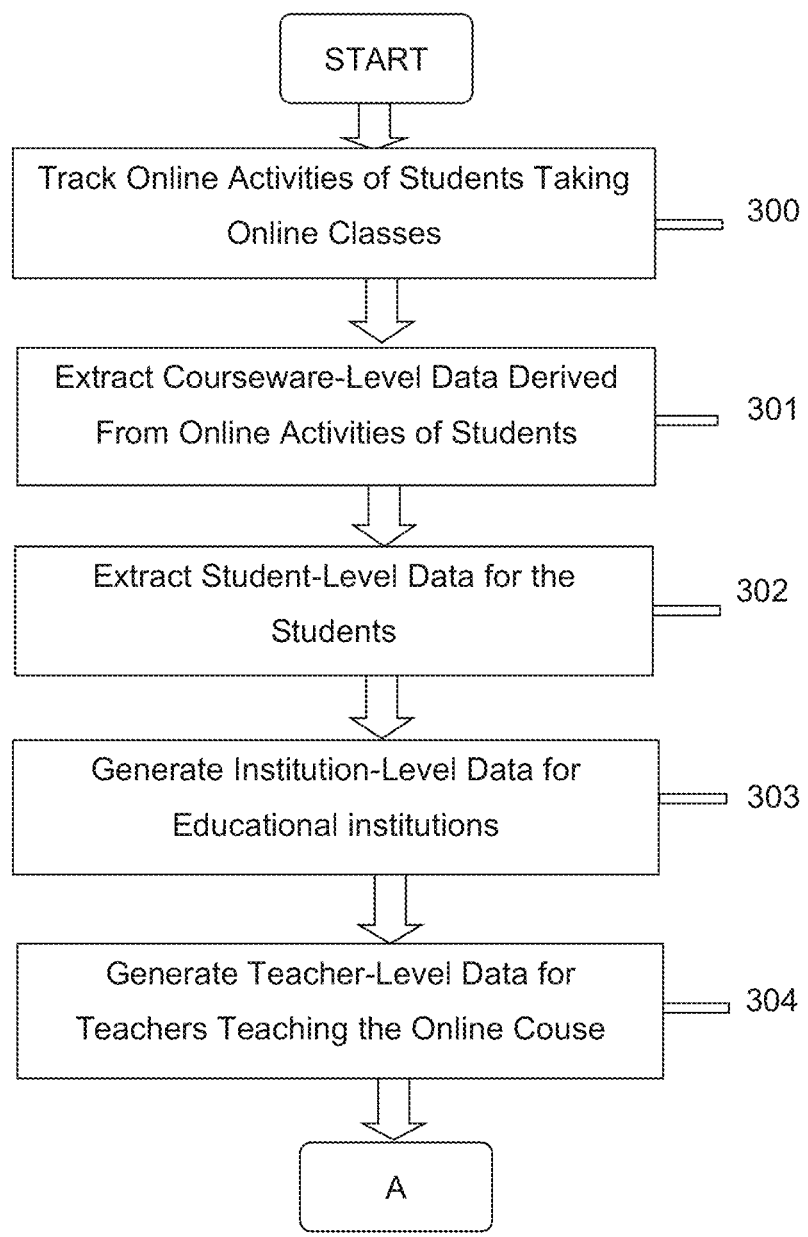
FIGS. 3-5 illustrate a flowchart for practicing an embodiment of the invention which uses courseware-level data, student-level data, institutional-level data and/or teacher-level data with a Bayesian multi-level model to generate a plurality of posterior distributions. The plurality of posterior distributions may be used to make one or more predictions as to problem areas for a teacher or student. The prediction(s) may be used to determine an appropriate remediation that may be performed by the teacher or by the student(s).

Referring to FIGS. 3 and 8, an example method will now be discussed for practicing the present invention. Data may be continuously and automatically collected and analyzed to generate course-level data for one or more online digital courses and student-level data 601 for one or more students taking the courses. Each of the one or more students may use a student client device (computer, cell phone, laptop, mobile device, etc.) to connect to the one or more online digital courses. The data may be collected by one or more webpages that are part of one or more websites. The website(s) may track online activities of student(s) taking the online course(s). The online activities may be, as non-limiting examples, performing online assignments and performing online assessments. (Step 300)

The website(s) may run on one or more servers and include a backend that has software that automatically (without human intervention) logs the online activities of the students in real-time and stores the online activities in one or more databases. The website may include a timer or other measuring devices and measure how long each student spent performing each online activity. If desired, the website may time and store how long each student spent on each part of an activity. Any level of granularity may be used in tracking each student's performance for each online activity.

As an example, if an online activity comprises performing an online assessment (test), the website may record and store in a database how long each student spent on the test, how long each student spent on each question of the test, how well each student performed on the test (measured, as an example, by a letter grade or a percent correct) and how well each student did on each question of the test.

As another example, if the online activity is performing an online assignment, the website may record and store in a database how long each student spent on the online assignment and/or on various parts of the online assignment. As an example, if the online assignment is reading a book (an electronic or online digital book that may be automatically monitored by the website), the website may record how long each student spent reading the book, how long each student spent reading each chapter and how long each student spent reviewing a particular graph, illustration, table, etc. or performing any other activity related to the book. If a student spends more than one online session reading a book (which is very likely to happen) or chapter or reviewing graphs, illustrations, tables, etc., two or more times from different online sessions may be logged, stored and then added together.

In some embodiments, the website may calculate how difficult each chapter is by dividing the number of words in the chapter by the amount of time (or average time for a group of students) spent reading the chapter. Chapters with a lower calculated words-per-time may be considered more difficult than chapters with a higher calculated words-per-time and appropriate warnings, advice, remediation measures and/or encouragement may be supplied to the students/ teacher regarding the chapter. While this example was explained with a chapter, the invention may analyze any learning objective in a similar manner to determine which learning objects are easier or more difficult as compared to other learning objects. As another example, the website may measure the number of interactions (mouse clicks, selected items on a webpage, time a mouse hovers over an object, etc.) performed by a student to try to determine if the student is having trouble with a chapter or assignment.

In some embodiments, a webpage of the website may have the capability of providing a hint to a student working on a problem/assignment if the student indicates a desire for a hint. The student may indicate the desire for a hint such as by selecting a particular icon, i.e., a hint icon or an item from a menu on the webpage. The website may track the number of times the student requested a hint and how long the student spent with each hint displayed on the webpage.

In some embodiments, a webpage of the website may have the capability of launching a tutoring session if the student indicates a desire for an additional tutoring session. The student may indicate the desire for a tutoring session by selecting a particular icon, i.e., a tutoring icon or an item from a menu on the webpage. The website may track the number of times the student requested an additional tutoring session and how long the student spent on each tutoring session.

Extract Courseware-Level Data

One or more servers may extract courseware-level data 600 derived from the tracked online activities of the plurality of students taking the plurality of online courses. The courseware-level data 600 is organized based on the structure of each course in a plurality of courses and stored in a database. In a preferred embodiment, each piece of data in the courseware-level data 600 is tied to, and specifically for, a particular course in the plurality of courses. In this manner courseware-level data 600 may be obtained for a plurality of courses and stored in a database. As examples, the courseware-level data 600 derived from the online activities of the plurality of students taking the plurality of online may comprise exam scores, homework scores and time spent on homework. Additional examples of courseware-level data 600 is listed in FIG. 6. As a specific example of data, data that a particular student (or an average for a plurality of students) spent 0.4 hours performing a particular online assignment (or reading a particular chapter in a book) may be recorded in the database as courseware-level data 600. (Step 301)

Extract Student-Level Data

Student-level data 601 for one or more students may also be collected and stored in a database using any desired method. As non-limiting examples, student-level data 601 may be collected by monitoring each student's online activities, such as performing assignments or performing assessments, and storing data representing each student's performance in a database. In a preferred embodiment, student-level data 601 may be collecting while, or at the same time, that courseware-level data 600 is collected. In some embodiments, the student-level data 601 may be collected from the same collection of logged online student activities as the courseware-level data 600. As an example, a website may record a time it took for a student to read a chapter in a course both for the courseware-level data 600 for the course being taken and in the student-level data 601 for the student reading the chapter.

Student-level data 601 may also be collected from each student's registration information when the student registers with an educational institution or when the student registers for a course. The system may also perform online searches using the student's name to gather public information about the student to use as student-level data 601. Regardless of how the student-level data 601 is collected, the student-level data 601 is preferably organized based on each student in a plurality of students and stored in a database. In a preferred embodiment, every piece of data in the student-level data 601 is tied to, and specifically for, a student in the plurality of students. As an example, the student-level data 601 may be previous online courses taken, grades for at least some of the previous online courses taken and amount of time taken for each assignment in the previous online courses taken. Further examples of student-level data 601 may be found in FIG. 6. As a specific example, data that a particular student is an English major or has a grade-point-average of 3.25 (this data may be collected from school transcripts for the student) may be stored in the database. (Step 302)

Generate Institutional-Level Data

Institutional-level data may also be collected and stored, i.e., generated, by the one or more servers, for a plurality of educational institutions. This information may be entered by an administrator from published information from the education institutions or read by the backend of the website(s) from publicly available online data sources. Regardless of how the institutional-level data is collected, the institutional-level data is preferably organized based on each institution in a plurality of institutions and stored in a database. In a preferred embodiment, every piece of data in the institutional-level data is tied to, and specifically for, a particular institution in the plurality of institutions. As non-limiting examples, the institutional-level data may comprise public/private data, admission requirement data and historical institution performance data. Additional examples of institutional-level data may be found in FIG. 6. As a specific example, data (which could be a 1 in a particular field) that a particular institution offers a four-year degree may be stored in the database. As another example, data reflecting an institutional ranking (which could be a 23 in a particular field to represent being 23rd out of 35 institutions), based on how students from the institution perform in the courses in the courseware-level data 600 compared to students from other institutions performing the same courses, may be stored in the database. In addition, or alternatively, another institutional ranking based on how students perform from the institution as compared to students from other institutions on any desired metric, such as standardized tests, national rankings, etc. may be collected and stored as institutional-level data. (Step 303)

Generate Teacher-Level Data

Teacher-level data 603, specific to each teacher in a plurality of teachers, may also be collected using any desired method. As a non-limiting example, the teacher-level data 603 may be collected from information provided by each teacher at the time each teacher is hired or at any other desired time. As an example, the number of years teaching in general and/or the number of years teaching a specific topic or course may be determined and stored in the database (or data store 110) as teacher-level data 603 for each teacher. Additional examples of teacher-level data 603 may be found in FIG. 6. This data is preferably updated periodically to reflect each teacher's current information. Thus, the teacher's tenure and number of times a course is taught should be updated as needed in a timely manner.

In some embodiments, the duration and/or number of times a teacher interacts with students in a course may be tracked and stored as teacher-level data 603. As specific examples, the number of interactions or outreaches, such as by online meetings (audio and/or video), text messages or emails, the teacher sends to the students may be tracked, encoded and stored in a database as teacher-level data 603.

In some embodiments, the number of alterations made to a course, and more specifically, a standard course template may be tracked and stored as teacher-level data 603. The alterations to the standard course template may comprise adding, deleting, rearranging, activing certain features and/or editing the assignments, projects and/or assessments in the standard course template. The more alterations made to the standard course template may indicate an additional level of engagement or familiarity of the course by the teacher.

As another non-limiting example, at least part of the teacher-level data 603 may be collected when the courseware-level data 600 and/or the student-level data 601 is collected and stored. As an example, a website may record how long it took for students in a course taught by the teacher to perform an assignment. Comparing the performance of students for different teachers allows teachers to compare themselves against each other. (Step 304)

Quantize the Data

The data for the courseware-level data 600, student-level data 601, institution-level data 602 and/or the teacher-level data 603 may be quantized. As an example, a student may have a major in computer science. This information may be converted to a number and stored in the student-level data 601. In preferred embodiments, non-numerical data is quantized so that similar data is given numbers closer to each other than dissimilar data. Thus, as an example, all science/engineering majors may be given similar numbers while all language majors may also be given similar numbers, but that are separated from the science major numbers.

Normalize and/or Standardize the Data

In addition, the data for the courseware-level data 600, student-level data 601, institution-level data 602 and/or the teacher-level data 603 may be normalized and/or standardized. Normalizing and standardizing the data may assist in analyzing the data so that certain pieces of information (that have higher or lower numbers merely due to their units or measuring method) are not given an inappropriate weight. As a non-limiting example, all of the data may be normalized to a number between 0 and 1, between −1 and 1 or between 0 and 100. Thus, a student who received a "B" on a test may have the "B" quantized to an 85% (an average percentage for a "B") and then normalized to a 0.85 in a system where all data is desired to be between 0 and 1. Reading times may be normalized, as a non-limiting example, by considering a reading time that is longer than the reading time for 95% of the students to be a 1 and all other reading times are scaled to a number between 0 and 1 (if that is desired). As an example, if 95% of students are able to read a chapter in 1 hour or less and a student reads the chapter in 45 minutes, the student's data for reading the chapter in the student-level data 601 may be 0.75 (45 minutes divided by 60 minutes). In this method, all students taking over one hour could be assigned a 1. In addition, or alternatively, all or some portion of the courseware-level data 600, student-level data 601, institutional-level data 602 and/or teacher-level data 603 may be standardized so that the data for any desired measurement has a mean of 0 and a standard deviation of 1.

In a preferred embodiment, some of the courseware-level data 600, student-level data 601, institutional-level data 602 and/or teacher-level data 603 may be combined. As an example, a score received for an assignment/assessment (preferably already normalized or standardized) may be combined (either by, as non-limiting examples, adding or averaging) with a time it took to complete the assignment/ assessment (also preferably already normalized or standardized). The combination of a normalized/standardized score and a normalized/standardized time may be considered a challenge index for a particular assignment/assessment. This helps in reducing the amount of data needed by the Bayesian multi-level model 800.

Request for an Analysis from a Teacher

Figure 4:
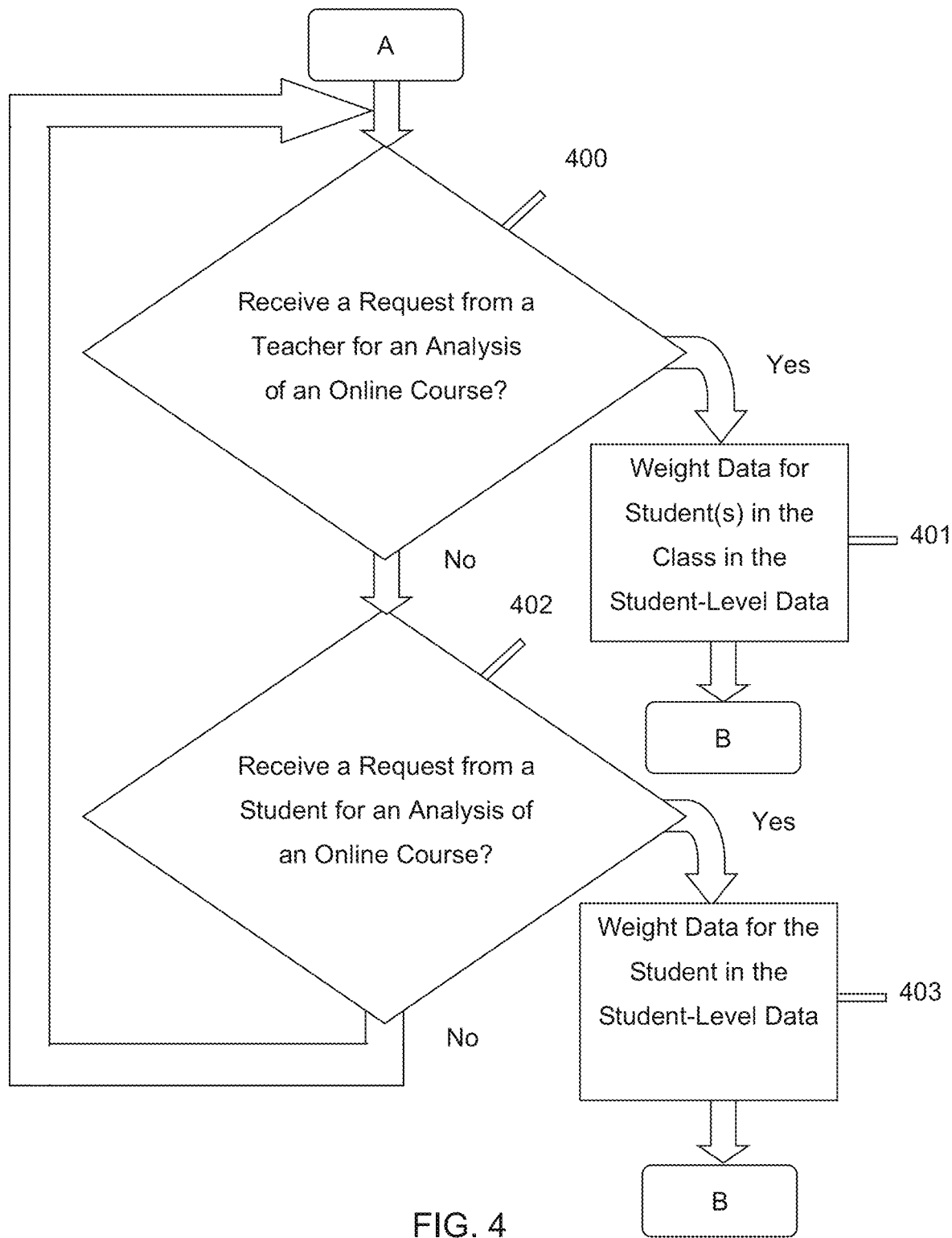

Referring to FIG. 4, a teacher may request to have a course analyzed to detect assignments or assessments in the course that may require additional work or are more difficult to understand. (Step 400) The teacher may use a teacher client device to make requests and connect to the online digital course, administrative website or website portal. The analysis may proceed based on the performances of all past students that have taken the course. In another embodiment, the teacher may wish to customize the analysis based on the students that are currently registered in the course (or for any other group of students that the teacher would like an analysis to be based on). In this case, the data for the students in the course may be weighted so that the analysis is more specific towards the students that are actually in the course. (Step 401) This may be desirable as the students in the course may be very different, either in a positive or a negative direction, from the students who have taken the course in the past. The Bayesian multi-level model preferably automatically determines the amount of weight to give to the student-level data based on all or some selected portion of the courseware-level data 600, student-level data 601, institutional-level data 602 and teacher-level data 603.

Request for an Analysis from a Student

A student may also request to have a course analyzed to detect assignments or assessments in the course that may require additional work. (Step 402) The analysis may proceed based on the performances of all past students that have taken the course. In another embodiment, the student may wish to customize the analysis based on the student. In this case, the data for the student in the course may be weighted so that the analysis is more specific towards the student that is requesting the analysis. (Step 403) This may be desirable as the student requesting the analysis in the course may be very different, either in a positive or a negative direction, from the students who have taken the course in the past.

Weight Data for Course in Courseware-Level Data

Figure 5:
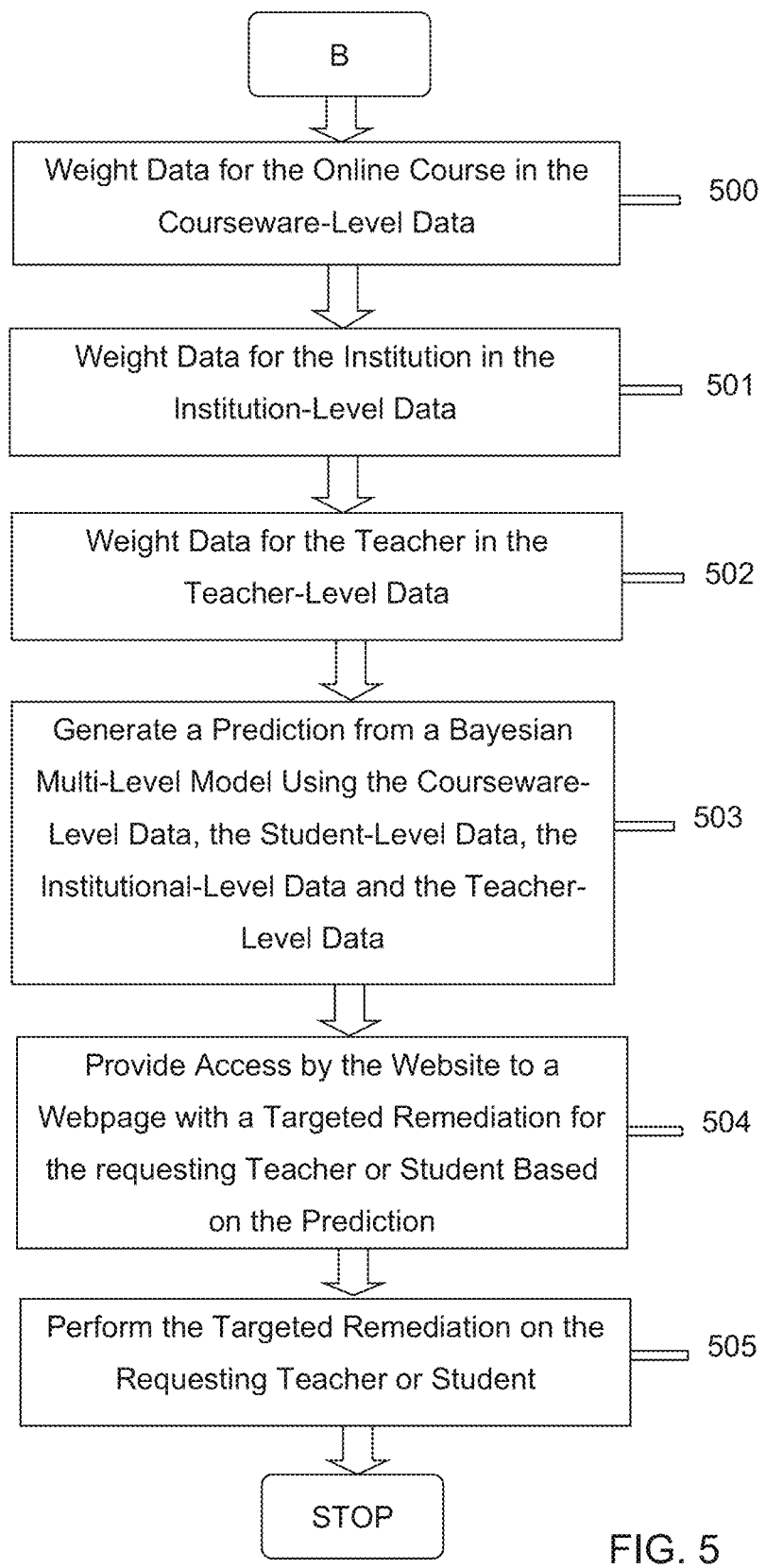

With reference to FIG. 5, in performing an analysis for an online digital course, the data specific to the online digital course is much more important than the data related to other online digital courses. This may be accounted for by heavily weighting the data specific to the online digital course being analyzed in the courseware-level data 600. (Step 500) The Bayesian multi-level model preferably automatically determines the amount of weight to give to the courseware-level data based on all or some selected portion of the courseware-level data 600, student-level data 601, institutional-level data 602 and teacher-level data 603.

Weight Data for Institution in Institution-Level Data

In performing an analysis for an online digital course, the analysis may use institutional-level data from none or all of the institutions. In preferred embodiments, it may be desirable to weight the data in the institutional-level data for the one institution that is offering the analyzed course. This will further customize the analysis by taking into account the institution that is offering the course. (Step 501) The Bayesian multi-level model preferably automatically determines the amount of weight to give to the institution-level data based on all or some selected portion of the courseware-level data 600, student-level data 601, institutional-level data 602 and teacher-level data 603.

Weight Data for Teacher

In some embodiments, an analysis of the course may be done without using teacher-level data 603. In other embodiments, the teacher-level data 603 may be used and the data in the teacher-level data 603 for the teacher that is teaching the analyzed course may be weighted. Weighting the teacher-level data 603 for the teaching that is teaching the course will further customize the analysis by taking into account that different teachers have different strengths and weaknesses in teaching different subject matters. (Step 502) The Bayesian multi-level model preferably automatically determines the amount of weight to give to the teacher-level data based on all or some selected portion of the courseware-level data 600, student-level data 601, institutional-level data 602 and teacher-level data 603.

The student-level data 601, courseware-level data 600, institutional-level data and/or teacher-level data 603 may be modeled by any desired statistical method to produce any desired prediction or analysis. It should be appreciated that not all of the described student-level data 601, courseware-level data 600, institutional-level data and teacher-level data 603 needs to be used in every analysis and that any desired sub-combination may be used. As a non-limiting example, it may be desirable to only use the courseware-level data 600, student-level data 601 and the institutional-level data (not the teacher-level data 603). It should also be appreciated that other levels or sources of data may also be used in addition to the described data levels without departing from the spirit of the invention.

In a preferred embodiment, a Bayesian multi-level model 800 may be used to generate a plurality of posterior distributions 801 using the student-level data 601, courseware-level data 600, institutional-level data and/or teacher-level data 603. In this embodiment, one or more of the student-level data 601, courseware-level data 600, institution-level data 602 and teacher-level data 603 may be analyzed using the Bayesian multi-level model 800. If the analysis is to be for a specific course, then the data for that course in the courseware-level data 600 may be weighted. If the analysis is to be for a specific student or group of students, then the data for that specific student or group of students may be weighted. If the analysis is to be for a specific institution, then the data for that institution in the institution-level data 602 may be weighted. (Step 503)

The Bayesian multi-level model 800 may have any desired number of levels and each level may be based on any desired source of data. As non-limiting examples, the Bayesian multi-level model 800 may comprise three levels, four levels or more than four levels. Bayesian multi-level modelling is a statistical model written in multiple levels (hierarchical form) that estimates the parameters of the posterior distribution using the Bayesian method. Each level combines to form the hierarchical model, and Bayes' theorem may be used to integrate them with the data, e.g., courseware-level data 600, student-level data 601, institution-level data 602 and/or teacher-level data 603, and account for all the uncertainty that is present. The result of this integration is a posterior distribution, also known as an updated probability estimate or prediction 802, as additional evidence on the prior distribution is acquired.

Figure 9:
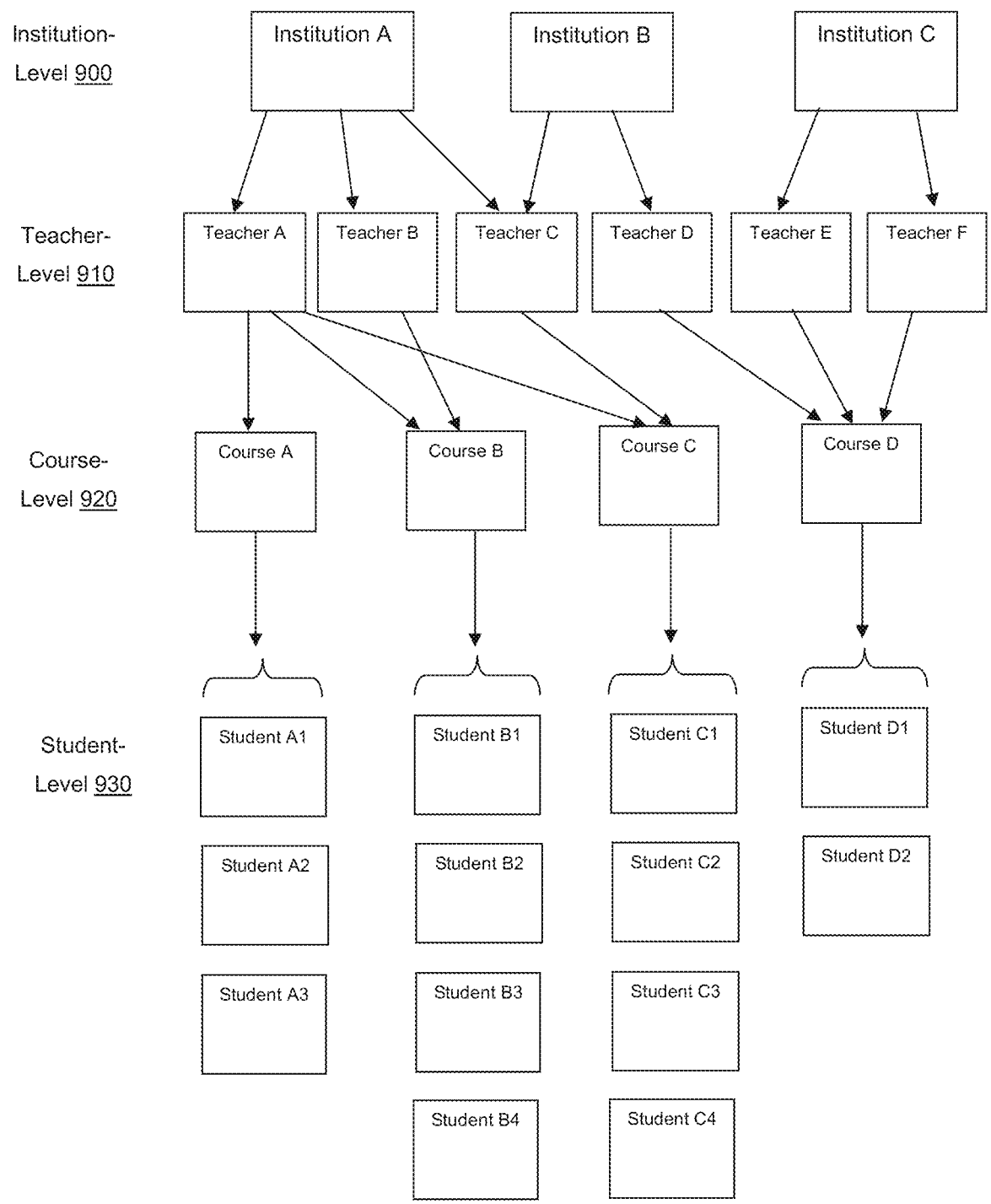
FIG. 9 illustrates a hierarchical graph illustrating a possible arrangement of the different levels that may be used with the present invention.

FIG. 9 illustrates one possible hierarchical structure that may be used with the present invention. In the illustrated non-limiting example, the hierarchical structure comprises an institution-level at the top or first level, a teacher-level at a second level, a course-level a third level and a student-level at a fourth level. In the illustrated hierarchical structure, Institution A is associated with Teachers A, B and C; Teacher A teaches courses A, B and C; and Course A had students A1, A2 and A3. It should be appreciated that the data is dynamic and is preferably continuously updated as needed. For example, new institutions may start or stop teaching the courses, new teachers may be hired by the institutions, teachers may start teaching different classes and students may be taking multiple classes in addition to taking new classes in the future as the quarters/semesters/years progress.

In preferred embodiments, the data from the past is stored and used in future predictions as long as the data is relevant to predicting future course results (once data is no longer relevant to making future predictions or producing future posterior distributions 801, the data may be deleted).

In other possible hierarchical structures, the teacher-level and the course-level may have their levels switched, the teacher-level may be removed and/or other possible data-levels may be added to the hierarchical structure.

The Bayesian multi-level model 800 may generate a plurality of posterior distributions 801 for a group of students taking a course at an institution with a teacher. The Bayesian multi-level model 800 may use courseware-level data 600 (preferably with data specific to the course being heavily weighted), student-level data 601 (preferably with data specific to the student being heavily weighted), institution-level data 602 (preferably with data specific to the institution heavily weighted and/or teacher-level data 603 (preferably with data specific to the teacher of the course being heavily weighted). The plurality of posterior distributions 801 may be used to create a graph/table/illustration that may be displayed to a student/group of students or a teacher to provide information regarding different features or aspects of the course.

Figure 12:
FIG. 12 illustrates a graph showing a predicted difficulty level for each chapter in a book using a plurality of posterior distributions from a Bayesian Multi-level Model.

FIG. 12 illustrates a graph showing a predicted difficulty level for each chapter in a book using a plurality of posterior distributions 801 from a Bayesian multi-level model 800. Each posterior distribution in the plurality of posterior distributions 801 may be generated for one of the chapters in the book. The plurality of posterior distributions 801 predicts (as the numbers are higher for that chapter) that Chapter 12 in a book will be slightly more difficult than any of the other chapters in the book. The subject of Chapter 12 may be used to determine an appropriate remedial action that may be used to increase the understanding of the predicted problematic subject matter. Based on this information, the student(s) or teacher may be encouraged to provide extra effort, preparation or take remedial actions regarding the material covered by Chapter 12.

Figure 13:
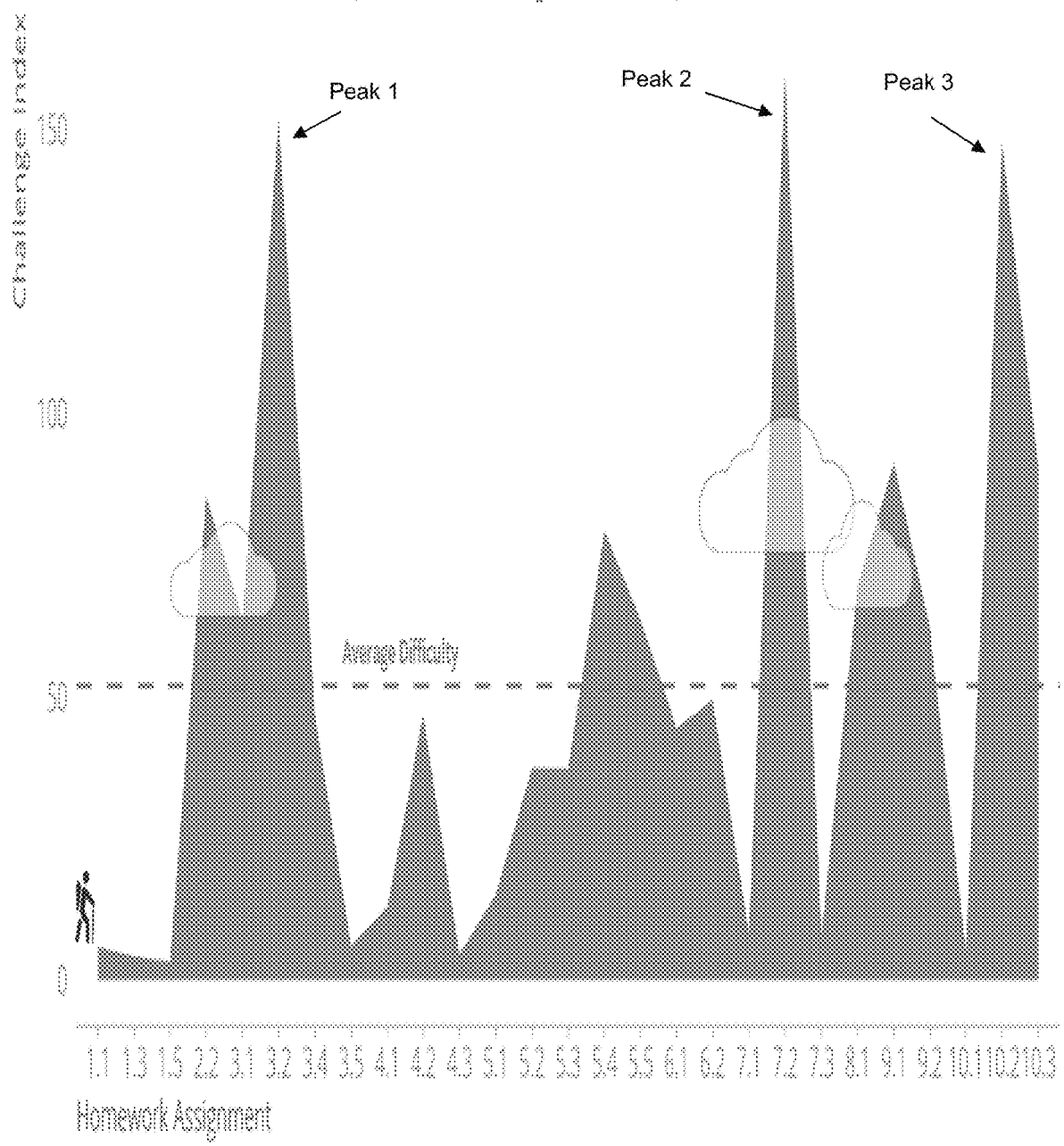
FIG. 13 illustrates a graph showing a prediction for a topography of course homework challenge based on a plurality of posterior distributions from a Bayesian multi-level model.

FIG. 13 illustrates a graph showing predictions 802 for a topography of course homework challenge based on a plurality of posterior distributions 801 from a Bayesian multi-level model 800. Each posterior distribution in the plurality of posterior distributions 801 may be for one of the homework assignments. These posterior distributions 801 predict (as the numbers are higher for that homework assignment) three different peaks in difficulty for the homework assignments. Specifically, the plurality of posterior distributions 801 used to generate FIG. 13 predicts that homework assignments 3.2 (Peak 1), 7.2 (Peak 2) and 10.2 (Peak 3) are going to be the most difficult based on past experiences of other students taking the course. Based on this information, the student(s) or teacher may be notified (by text, email, etc.) that extra effort, preparation or time may be needed for these assignments. In preferred embodiments, a remedial action for each of these assignments may be selected based on the subject matter of the assignments 3.2, 7.2 and 10.2.

Figure 14:
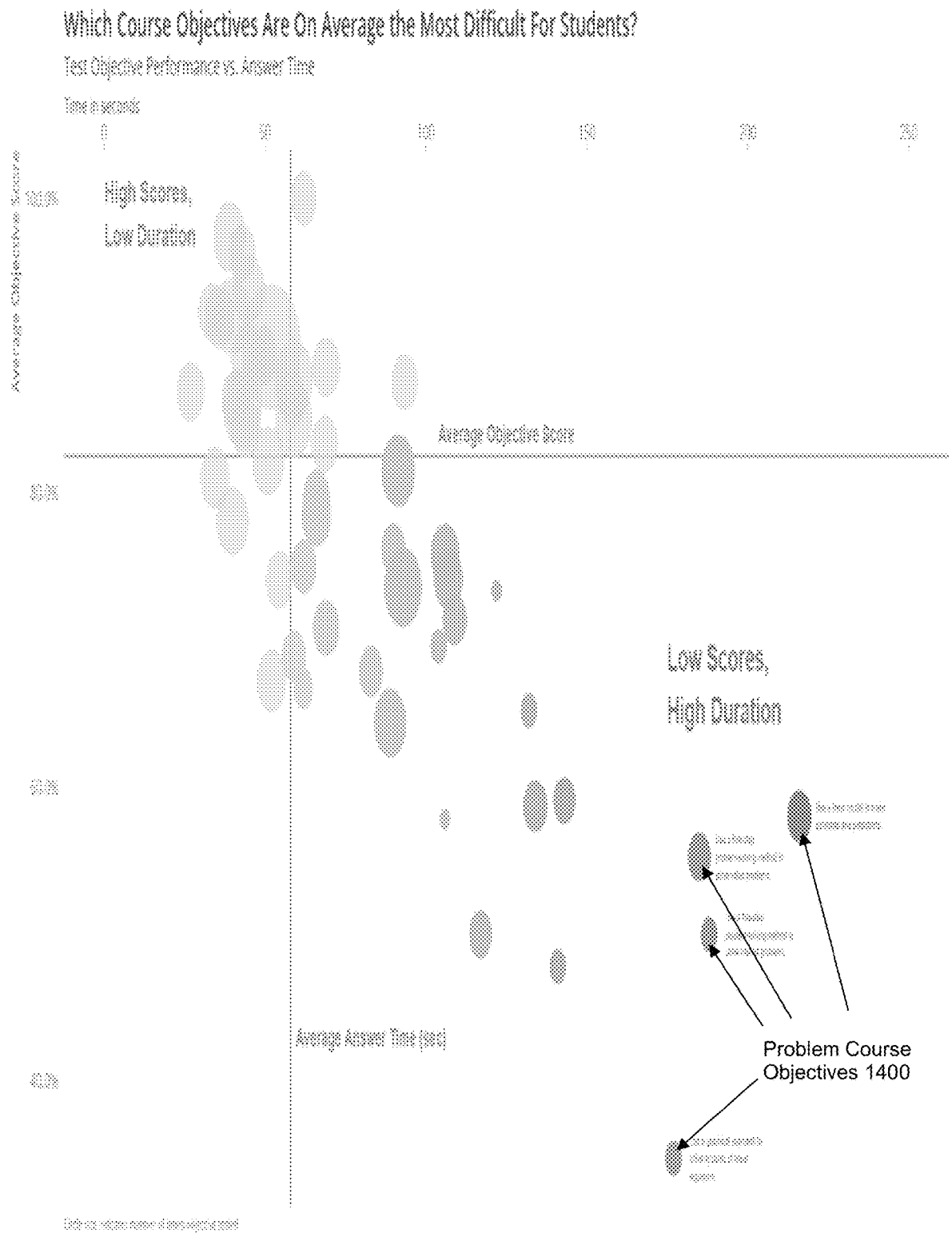
FIG. 14 illustrates a graph showing a predicted of which course objectives are on average the most difficult for students based on a plurality of posterior distributions from a Bayesian multi-level model.

FIG. 14 illustrates a graph showing a prediction 802 of which course objectives are on average the most difficult for students based on a plurality of posterior distributions 801 from a Bayesian multi-level model 800. Each posterior distribution in the plurality of posterior distributions 801 may be for one of the course objectives. As indicated by the graph, the plurality of posterior distributions 801 predicts (as the numbers are higher for those course objectives) four different course objectives that are particularly difficult. Specifically, the plurality of posterior distributions 801 used to generate FIG. 14 predicts that course objectives 1400 are going to be the most difficult based on the past experiences of other students taking the course. Based on this information, the student(s) or teacher may be notified (by text, email, etc.) that extra effort, preparation or time may be needed for these course objectives. In preferred embodiments, a remedial action for each of these course objectives may be selected based on the subject matter of each of these problematic course objectives.

In some embodiments, the prediction 802 derived from a plurality of posterior distributions 801 of the Bayesian multi-level model 800 may be used to determine a recommended remediation 803. As an example, the prediction 802 may determine that most of the students are likely to have problems with an assignment dealing with dividing fractions. The website may provide, as non-limiting examples, additional instructions, links to additional resources, links to education videos, lists of teacher resources and/or links to videos on how to teach the subject matter of dividing fractions. (Step 504) The website may perform a targeted remediation 803 on the teacher to assist the teacher in teaching the subject matter(s) determined to be most likely a problem. (Step 505)

As another example, the prediction 802 may determine that a student is likely to have problems with an assignment dealing with Latin roots in an English class. The website may provide, as non-limiting examples, additional instructions, links to additional resources, links to education videos, lists of student resources and/or links to videos on Latin roots. The website may perform a targeted remediation 803 on the student to assist the student in learning the subject matter determined to be most likely a problem for the student. In another embodiment, one or more severs may select a teacher remediation 803 resource based on a selected remediation 803 and administering the teacher remediation 803 on a website.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
a website running on one or more servers in a plurality of servers, wherein the website and the plurality of servers are configured to:
track online activities of a plurality of students operating a plurality of student client devices and taking a plurality of online courses, wherein the online activities comprise the plurality of students performing online assignments and online assessments on the plurality of student client devices;
encode and store the online activities of the plurality of students in one or more databases;
extract courseware-level data derived from the tracked online activities of the plurality of students operating the plurality of student client devices and taking the plurality of online courses;
extract student-level data for the plurality of students from i) the online activities of the plurality of students operating the plurality of student client devices and ii) registration information entered by the plurality of students, encoded and stored in the one or more databases;
retrieve institution-level data for a plurality of educational institutions from the one or more databases;
receive a request from a teacher operating a teacher client device for an analysis of an online course in the plurality of online courses;
weight data for the online course in the courseware-level data;
generate a prediction from a Bayesian multi-level model comprising a courseware level, a student level and an institution level, wherein the Bayesian multi-level model uses the courseware-level data, the student-level data and the institutional-level data to generate the prediction;
determine a targeted remediation linked in the one or more databases to the prediction;
provide access to a webpage for the teacher client device with the targeted remediation based on the prediction; and
perform the targeted remediation with the webpage on the teacher while the teacher is using the teacher client device.

2. The system of claim 1, wherein the website and the plurality of servers are further configured to, prior to the prediction being generated, weight data for students taking the course in the student-level data.

3. The system of claim 1, wherein the website and the plurality of servers are further configured to, prior to the prediction being generated, weight data for an institution offering the course in the institutional-level data.

4. The system of claim 1, wherein the website and the plurality of servers are further configured to, prior to the prediction being generated, weight data for the teacher in the teacher-level data.

5. The system of claim 1, wherein the courseware-level data derived from the online activities of the plurality of students taking the plurality of online courses comprises exam scores, homework scores and time spent on homework.

6. The system of claim 1, wherein the student-level data comprises previous online courses taken, grades for at least some of the previous online courses taken and amount of time taken for each assignment in the previous online courses taken.

7. The system of claim 1, wherein the targeted remediation comprises:
select a teacher remediation resource based on the targeted remediation; and
administer the teacher remediation resource on the teacher.

8. A method, comprising the steps of:
tracking, by a website, online activities of a plurality of students operating a plurality of student client devices and taking a plurality of online courses, wherein the online activities comprise the plurality of students performing online assignments and online assessments on the plurality of student client devices;
encoding and storing the online activities of the plurality of students in one or more databases;
extracting, by one or more servers, courseware-level data derived from the tracked online activities of the plurality of students operating the plurality of client devices and taking the plurality of online courses;
extracting, by the one or more servers, student-level data for the plurality of students operating the plurality of student client devices from i) the online activities of the plurality of students and ii) registration information entered by the plurality of students encoded and stored in the one or more databases;
retrieving, by the one or more servers, institution-level data for a plurality of educational institutions from the one or more databases;
receiving, by the website, a request from a student operating a student client device for an analysis of an online course in the plurality of online courses;
weighting, by the one or more servers, data for the online course in the courseware-level data;
generating a prediction from a Bayesian multi-level model comprises a courseware level, a student level and an institution level, wherein the Bayesian multi-level model uses the courseware-level data, the student-level data and the institutional-level data to generate the prediction;
determining a targeted remediation linked in the one or more databases to the prediction;
providing access by the website to a webpage, for the student client device, with the targeted remediation based on the prediction; and
performing by the webpage the targeted remediation on the student while the student is operating the student client device.

9. The method of claim 7, further comprising the step of:
prior to generating the prediction, weighting data for the students taking the course in the student-level data.

10. The method of claim 7, further comprising the step of:
prior to generating the prediction, weighting data for an institution offering the course in the institutional-level data.

11. The method of claim 7, wherein the courseware-level data derived from the online activities of the plurality of students taking the plurality of online courses comprises exam scores, homework scores and time spent on homework.

12. The method of claim 7, wherein the student-level data comprises previous online courses taken, grades for at least some of the previous online courses taken and amount of time taken for each assignment in the previous online courses taken.

13. The method of claim 7, wherein the institutional-level data comprises public/private data, admission requirement data and historical institution performance data.

14. The method of claim 7, wherein the targeted remediation comprises the steps of:
   selecting, by the one or more servers, a student remediation resource based on the targeted remediation; and
   administering, by the website, the student remediation resource on the student.

15. A method, comprising the steps of:
   tracking, by a website, online activities of a plurality of students operating a plurality of student client devices and taking a plurality of online courses, wherein the online activities comprise the plurality of students performing online assignments and online assessments on the plurality of student client devices;
   encoding and storing the online activities of the plurality of students in one or more databases;
   extracting, by one or more servers, courseware-level data derived from the tracked online activities of the plurality of students operating the plurality of student client devices and taking the plurality of online courses;
   extracting, by the one or more servers, student-level data for the plurality of students from i) the online activities of the plurality of students operating the plurality of student client devices or ii) registration information entered by the plurality of students, encoded and stored in the one or more databases;
   retrieve, by the one or more servers, institution-level data for a plurality of educational institutions from the one or more databases;
   generating, by the one or more servers, teacher-level data for a plurality of teachers teaching the plurality of online courses;
   receiving, by the website, a request from a teacher operating a teacher client device for an analysis of an online course;
   weighting, by the one or more servers, data for the online course in the courseware-level data;
   generating, by the one or more servers, a prediction from a Bayesian multi-level model comprising a courseware level, a student level and an institution level, wherein the Bayesian multi-level model uses the courseware-level data, the student-level data, the institutional-level data and teacher-level data to generate the prediction;
   determining, by the one or more servers, a targeted remediation linked in the one or more databases to the prediction;
   providing access by the website to a webpage for the teacher client device with the targeted remediation based on the prediction; and
   performing by the webpage the targeted remediation on the teacher while the teacher is using the teacher client device.

16. The method of claim 14, further comprising the step of:
   prior to generating the prediction, weighting data for students taking the course in the student-level.

17. The method of claim 14, further comprising the step of:
   prior to generating the prediction, weighting data for an institution offering the course in the institutional-level data.

18. The method of claim 14, further comprising the step of:
   prior to generating the prediction, weighting data for the teacher in the teacher-level data.

19. The method of claim 14, wherein the courseware-level data derived from the online activities of the plurality of students taking the plurality of online courses comprises exam scores, homework scores and time spent on homework.

20. The method of claim 14, wherein the student-level data comprises previous online courses taken, grades for at least some of the previous online courses taken and amount of time taken for each assignment in the previous online courses taken.

* * * * *